(12) United States Patent
Pawlenko et al.

(10) Patent No.: US 7,252,084 B2
(45) Date of Patent: Aug. 7, 2007

(54) SOLAR TRACKING SYSTEM

(75) Inventors: Ivan Pawlenko, Holland, PA (US); Larry Samson, Langhorne, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 345 days.

(21) Appl. No.: 10/878,822

(22) Filed: Jun. 28, 2004

(65) Prior Publication Data
US 2005/0284468 A1    Dec. 29, 2005

(51) Int. Cl.
*F24J 2/38* (2006.01)
*F24J 2/46* (2006.01)

(52) U.S. Cl. .................. 126/605; 126/617; 126/572

(58) Field of Classification Search ............... 126/605, 126/606, 600, 601, 617, 573, 576, 578, 712, 126/708, 595, 593, 400; 250/203.4; 136/206, 136/246
See application file for complete search history.

(56) References Cited

U.S. PATENT DOCUMENTS

| | | | | |
|---|---|---|---|---|
| 4,223,214 A | * | 9/1980 | Dorian et al. ............ | 250/203.4 |
| 4,306,541 A | * | 12/1981 | Morrison et al. ........... | 126/580 |
| 4,332,238 A | * | 6/1982 | Garcia, Jr. .................. | 126/578 |
| 4,516,018 A | * | 5/1985 | Bodenheimer et al. .. | 250/203.4 |
| 4,586,488 A | * | 5/1986 | Noto ........................... | 126/578 |
| 4,628,142 A | | 12/1986 | Hashizume | |
| 4,832,001 A | | 5/1989 | Baer | |
| 5,325,844 A | * | 7/1994 | Rogers et al. ............... | 126/605 |
| 5,798,517 A | * | 8/1998 | Berger ...................... | 250/203.4 |

FOREIGN PATENT DOCUMENTS

JP    8-95641 A   *  4/1996

* cited by examiner

*Primary Examiner*—Josiah C. Cocks

(57) ABSTRACT

A solar tracking system has a first set of solar heat gain transducers (700) that produce respective first output signals to drive a reversible first motor (300) for changing a vertical angle of a solar collector (200); and a second set of solar heat gain transducers (700) that produce respective second output signals to drive a reversible second motor (608) for changing a horizontal angle of the solar collector (200); each of the transducers (700) having a thermistor (702) in thermal contact with a thermal mass (706); and a communications apparatus (900) receiving output voltage from solar cells (202) on the solar collector (200).

13 Claims, 6 Drawing Sheets

SOLAR TRACKING SYSTEM

The invention relates generally to the field of solar tracking, and more particularly, to a solar tracking system for self powered movement of a solar collector to face toward the sun. The solar collector provides solar cell output voltage to a communications apparatus.

BACKGROUND OF THE INVENTION

A solar collector collects solar radiation to produce solar cell output voltage. One type of solar collector moves with the sun, to face toward the sun as the sun changes its position during a daylight period. The elevation angle of the sun changes as the sun ascends and descends, and the horizontal angle of the sun changes with the movement of the sun from horizon to horizon. A solar tracking system adjusts an elevation angle of the solar collector and adjusts a horizontal angle of the solar collector to correspond with changes in the sun's position throughout a daylight period.

Prior to the invention, solar tracking for a solar collector was mathematically calculated. A computer program was devised to produce solar tracking for different days of the year, and for different latitude and longitude positions. The computer program controlled drive motors that moved the solar collector in a manner to track the sun.

U.S. Pat. No. 4,628,142 discloses a solar tracking system that foregoes a computer program. The system includes a cable that lengthens and shortens to move a solar collector about a horizontal axis. The cable is attached to coils of shape memory alloys that absorb solar energy. When illuminated by the sun, the coils of shape memory alloys uncoil, which lengthen the cable. When shaded from the sun, the shape memory alloys form tighter coils, which shorten the cable.

U.S. Pat. No. 4,832,001 discloses a solar collector having two solar heated canisters containing Freon. The canisters are interconnected to exchange Freon from one canister to another. When both canisters are illuminated by the sun, they absorb solar energy to evaporate the Freon to a gaseous state. When one of the canisters is shaded from the sun, the Freon in the shaded canister condenses to a liquid state, making the shaded canister containing liquid Freon heavier than the illuminated canister containing gaseous Freon. The heavier weight moves the solar collector until both canisters become illuminated by the sun, which evaporates the Freon and equalizes the canister weights.

BRIEF SUMMARY OF THE INVENTION

The present invention resides in a solar tracking system having, a first set of solar heat gain transducers that produce respective first output signals to drive a reversible first motor for changing a vertical angle of a solar collector, and a second set of solar heat gain transducers that produce respective second output signals to drive a reversible second motor for changing a horizontal angle of the solar collector. Advantageously, the solar tracking system is self-powered, by generating all of its power requirements to compensate for changes in sun position, and to move the solar collector in a sun tracking mode. Further, the solar tracking system has a solar collector with solar cells supplying output voltage to a communications apparatus having input voltage requirements.

A further advantage of the present invention is that the solar heat gain transducers are unaffected by ambient light conditions caused by artificial lights or lightning flashes. Further, the transducers operate under a wide range of ambient temperatures, and they operate to zero sum rapid changes in ambient temperature. Further, the solar tracking system compensates for any location relative to the sun's directional rays.

According to an embodiment of the invention, each of the solar heat gain transducers is a thermistor in thermal contact with a solar heated thermal mass.

According to a further embodiment of the invention, each of the first motor and second motor are controlled by a reversible motor control circuit. Each said motor control circuit has a corresponding set of thermistors supplying their output signals to a summing amplifier and an inverter, respectively. The inverter output is supplied to the summing amplifier. The amplifier output signal drives a corresponding first motor or second motor.

According to a further embodiment of the invention, a first rack and pinion mechanism is driven by the first motor for changing the vertical angle of the solar collector.

According to a further embodiment of the invention, a second rack and pinion mechanism is driven by the second motor for changing the horizontal angle of the solar collector.

Other embodiments and modifications thereof are apparent by way of example with reference to the following detailed description taken in conjunction with the accompanying drawings.

DETAILED DESCRIPTION OF THE INVENTION

Figure 2:
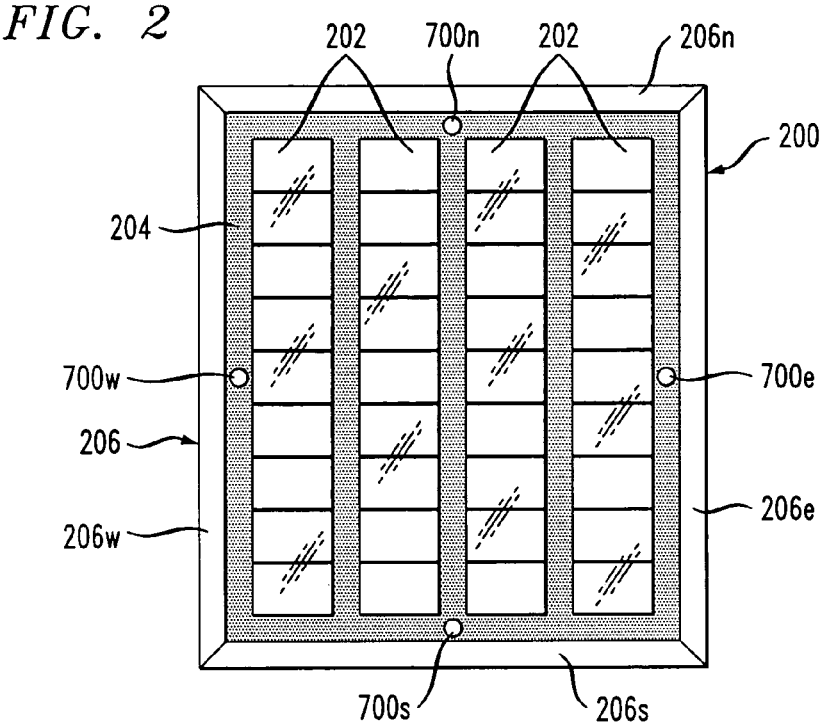
FIG. 2 is a front view of a solar collector as disclosed by FIG. 1.

FIG. 2 discloses an exemplary solar collector (200) having rows and columns of multiple solar cells (202) mounted on a panel face (204). The panel face (204) is circumscribed by a surrounding frame (206). The frame (206) has an East frame member (206e), a West frame member (206w), a North frame member (206n) and a South frame member (206s).

Figure 1:
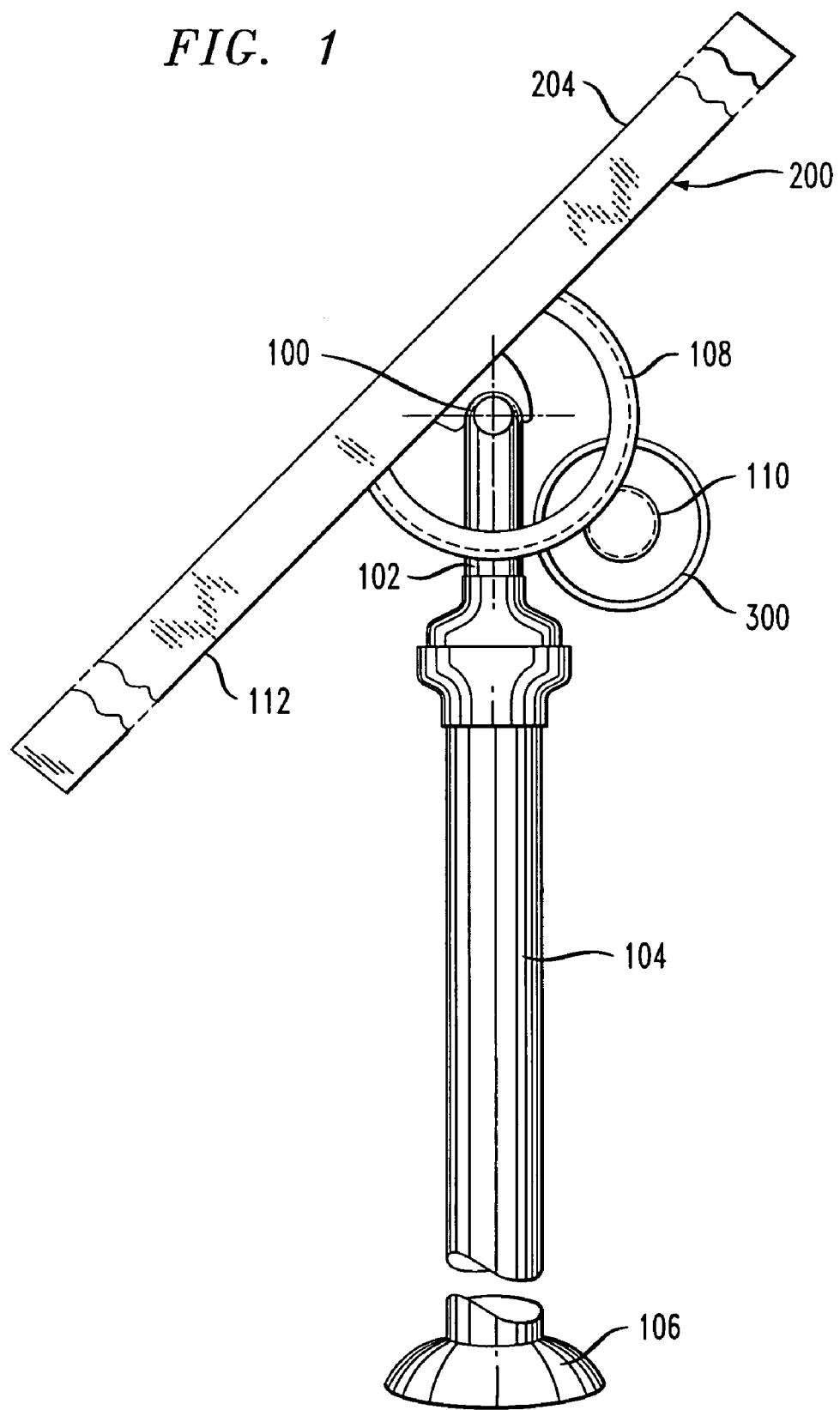
FIG. 1 is an elevation view of a solar collector and a solar tracking apparatus.

In FIG. 1, the solar collector (200) is shown edgewise with its panel face (204) pointing directly at the sun. A universal joint (100) pivotally mounts the solar collector (200) to a vertical rotatable shaft (102). The shaft (102) is rotatably mounted on a fixed base. For example, the base includes, a vertical mast (104) secured to the earth or to a building by a known pedestal (106). A first rack (108) and pinion (110) comprises a mechanism located on an underside (112) of the solar collector (200). The underside (112) is opposite to the panel face (204) that points directly at the sun. The mechanism has a semicircular first rack (108) that is arcuate in a vertical plane for vertical pivotal displacement of the solar collector (200). A first pinion (110) meshes with the first rack (108) to restrain and control displacement of the first rack (108).

Figure 3:
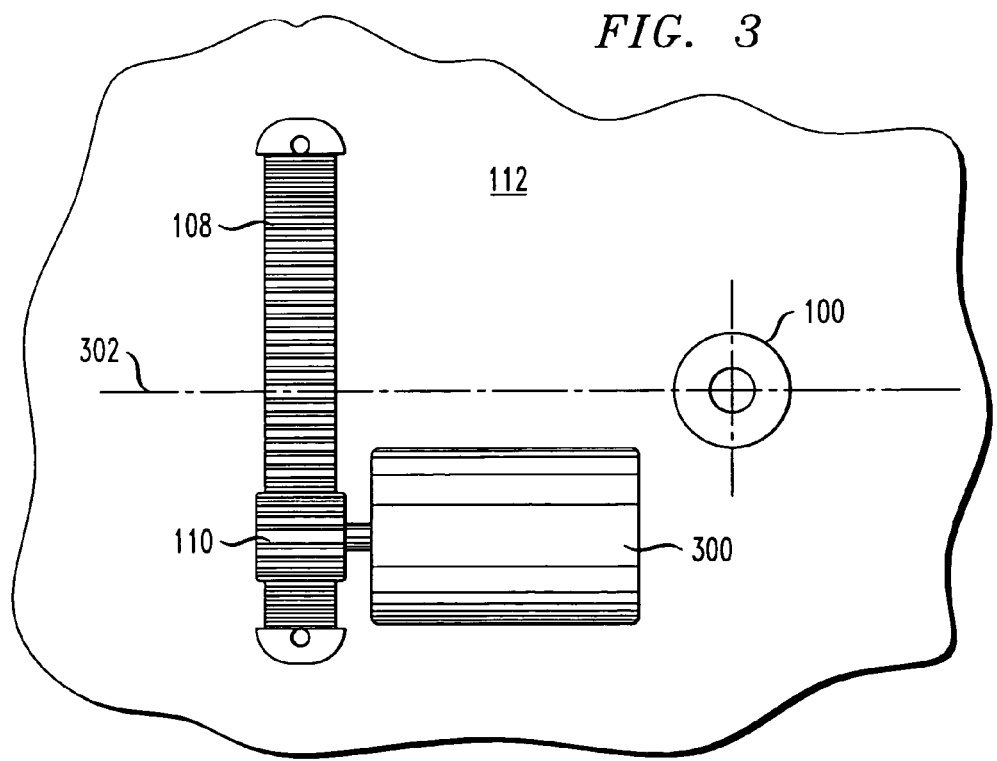
FIG. 3 is a fragmentary elevation view of a first rack and ;pinion mechanism on a solar collector facing the horizon.

As disclosed by FIG. 3, the first pinion (110) is mounted for rotation on a rotatable shaft of a first reversible DC drive motor (300). The first rack (108) is secured to the underside (112) of the solar collector (200). In operation, the first pinion (110) is driven by the first motor (300) to rotate while it meshes with the first rack (108). Thereby, rotation of the first pinion (110) produces arcuate displacement of the first rack (108) in a vertical first plane. The central axis (302) of the arcuate first rack (108) is horizontally aligned with the axis of the universal joint (100). Accordingly, arcuate displacement of the first rack (110) causes pivoting of the solar collector (200) about the universal joint (100), at an increasing vertical angle, or alternatively, at a decreasing vertical angle, to turn the panel face (204) toward the vertically ascending or descending sun.

Figure 4:
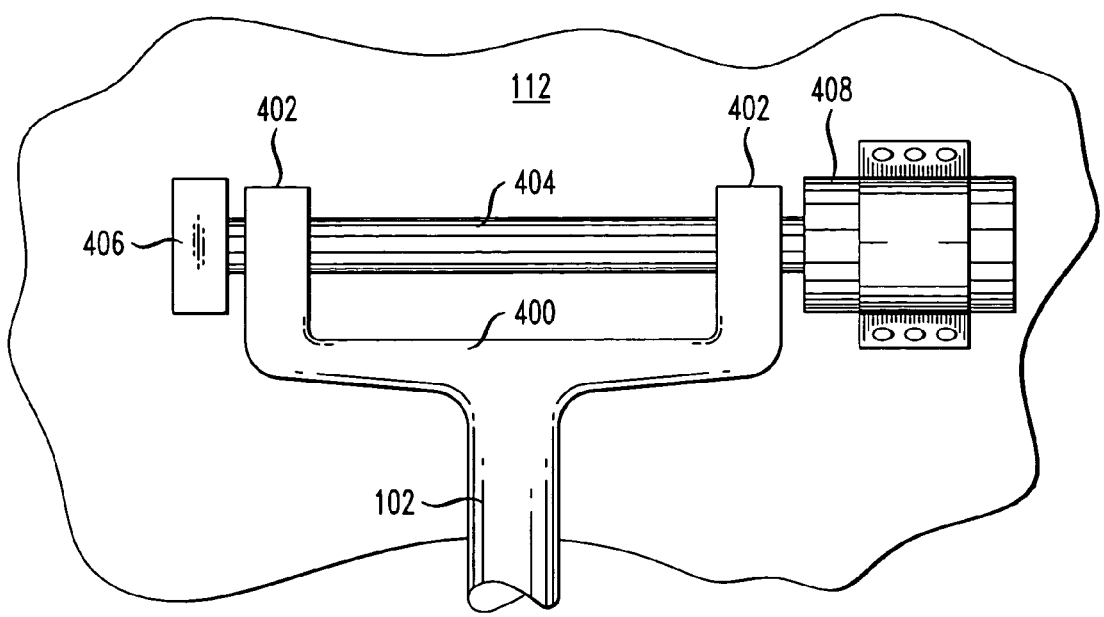
FIG. 4 is a fragmentary elevation view of a pivot connection for a solar collector.

According to another embodiment of the invention, FIG. 4 discloses a vertical shaft (102) that is integral with a yoke (400) having a pair of spaced apart yoke arms (402). The yoke (400) replaces the universal joint (100) disclosed by FIG. 1. A rotatable horizontal shaft (404) passes through the yoke arms. (402). One end of the rotatable horizontal shaft (404) is mounted for rotation in a respective pillow block (406). The pillow block (406) is mounted to the underside (112) of the solar collector (200). The other end of the rotatable horizontal shaft (404) is secured to the output shaft of another reversible DC drive motor (408). The solar collector (200) is rotatable about the horizontal shaft (104) to change the elevation angle of the panel face (204) to ascend or descend, and point at the sun. Further the solar collector (200) is rotatable about the vertical shaft (102) to change the angle of the panel face (204) from horizon to horizon to point at the sun.

Figure 5:
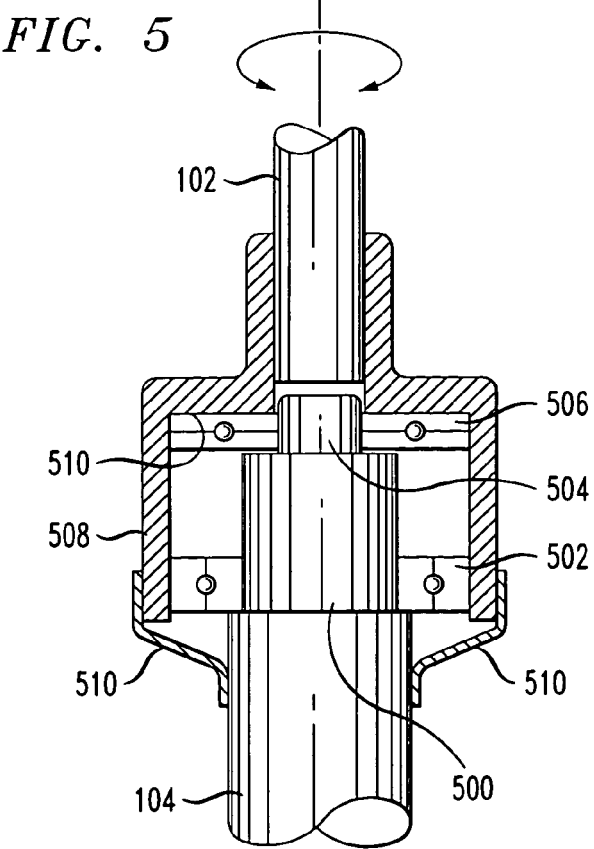
FIG. 5 is a fragmentary section view of a portion of a rotatable shaft mounted on a mast.

FIG. 5 discloses the vertical shaft (102) mounted on the mast (104). According to an embodiment of the invention, the solar collector (200) is adapted for rotation from horizon to horizon by having the solar collector (200) mounted for horizontal rotation about the mast (104). The mast (104) has a first stepped down diameter (500) on which is press fit a roller bearing (502). The mast (104) has a second stepped down diameter (504) on which is press fit a thrust bearing (506). The vertical shaft (102) is secured in a surrounding sleeve (508). The sleeve (508) has an enlarged stepped diameter that defines an interior shoulder (510) that seats downward on the thrust bearing (506). The sleeve (508) further extends to encircle and capture the roller bearing (502). A polymeric boot (510) covers the open end of the sleeve (508). The sleeve (508) and the vertical shaft (102) are rotatably supported by the thrust bearing (506) and the roller bearing (502), whereby the vertical shaft (102) is rotatable on the vertical mast (104) to change the angle of the panel face (204) from horizon to horizon.

Figure 6:
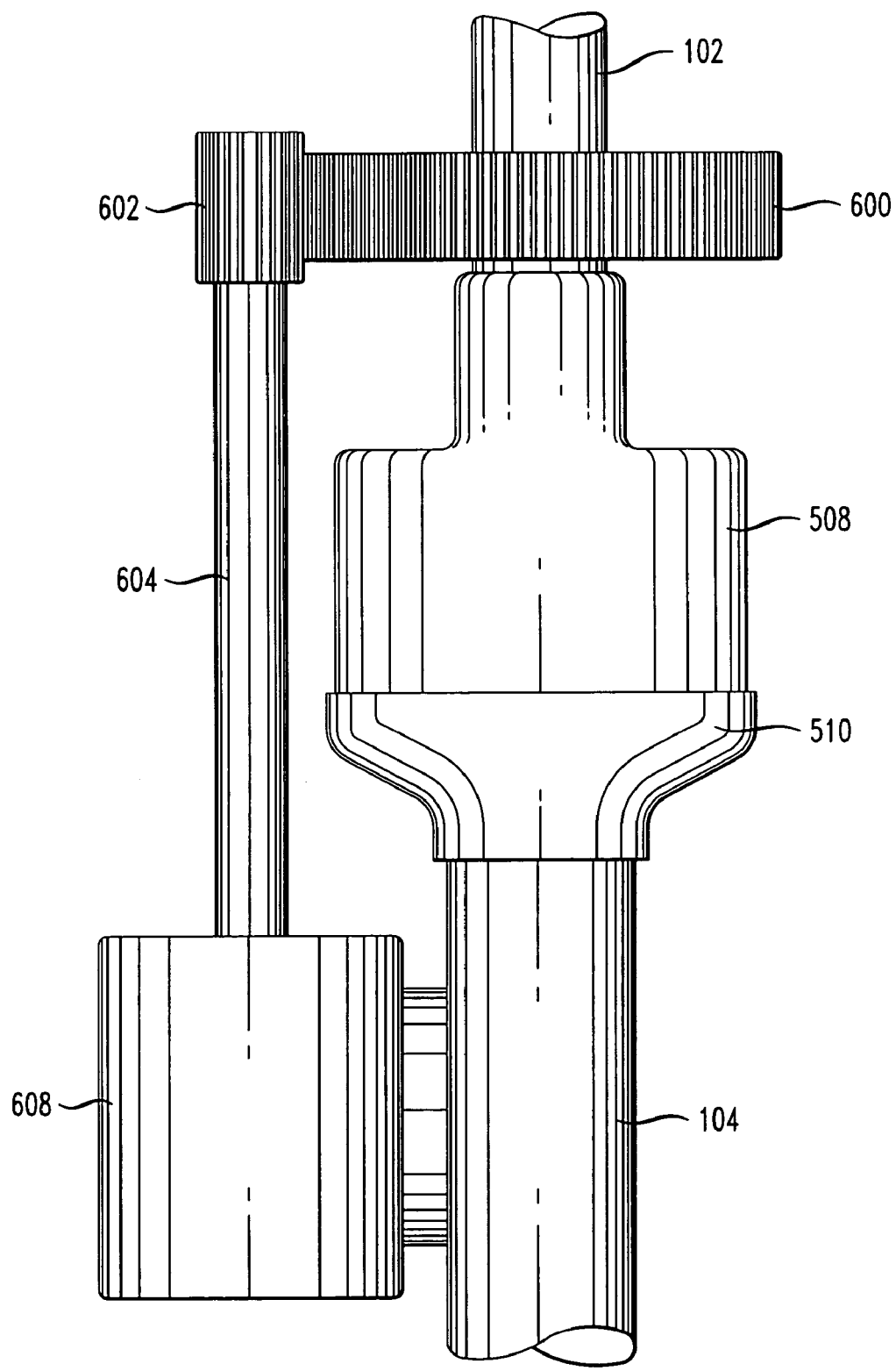
FIG. 6 is a fragmentary elevation view of a second rack and pinion mechanism.

FIG. 6 discloses a second rack (600) and pinion (602) mechanism mounted to rotatable vertical shaft (102) and the mast (104), respectively. The mechanism has a semicircular, second rack (600) that is curved in a horizontal plane for pivotal displacement of the solar collector (200) to change the horizontal angle of the panel face (204) from horizon to horizon. A second pinion (602) meshes with the second rack (600) to restrain displacement of the second rack (600).

Further, the second pinion (602) is mounted for rotation on a rotatable shaft (604) of a second reversible DC drive motor (608). In operation, the second pinion (602) is driven by the second motor (600) to rotate while it meshes with the second rack (600). Thereby, rotation of the second pinion (602) produces arcuate displacement of the second rack (600) in a horizontal plane. Displacement of the second rack (600) causes pivoting of the solar collector (200) at an increasing horizontal angle to turn the panel face (204) toward the sun as it progresses horizontally from horizon to horizon.

Figure 7:
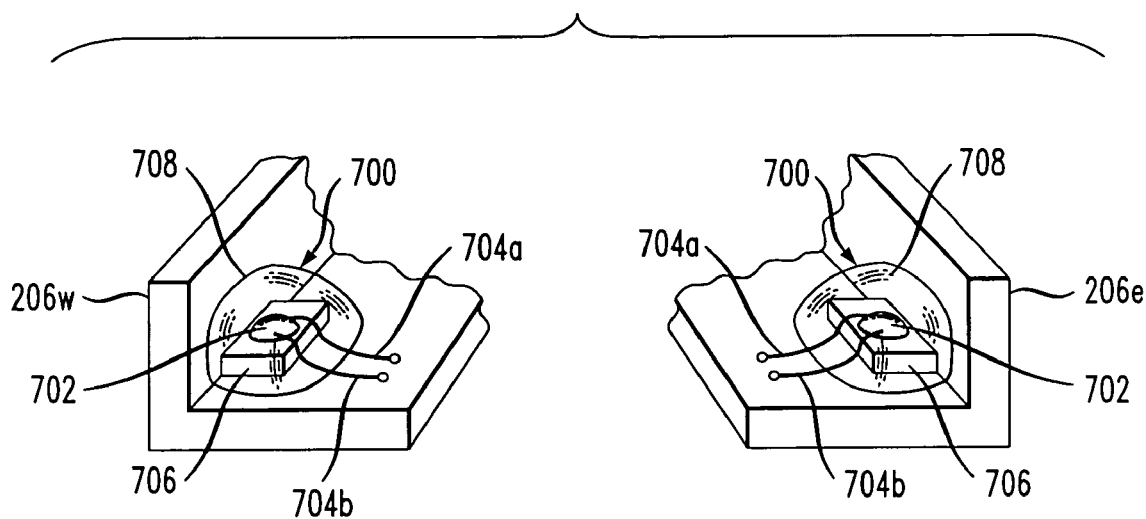
FIG. 7 is an isometric view partially cut away to disclose a cooperating pair of transducers.

FIG. 7 discloses a cooperating pair of solar heated transducers (700). Each transducer (700) includes a thermistor (702) having electrical leads (704a) and (704b). The thermistor (702) of each transducer (700) is in thermal contact with a thermal mass (706). The thermistor (702) and thermal mass (706) of each transducer (700) are contained in a solar energy collecting and heat insulating enclosure (708) that is solar energy transparent. For example, the enclosure (708) is formed of transparent material including and not limited to, glass or polymeric material, to form a hollow bubble or to form an encapsulant of the thermistor (702) and the thermal mass (706). The transparent material forms a convex lens to concentrate the sun's rays to focus on the thermal mass (706) to elevate the temperature of the thermal mass (706). The thermal mass (706) is a relatively small mass of highly conducting material to elevate rapidly in temperature. The highly conducting material includes and is not limited to, aluminum and copper coated with a heat absorbing paint. The thermistor (702) senses the elevated temperature and produces an electrical output in proportion to the temperature. The pair of electrical leads (704a) and (704b) project outwardly from the enclosure (708) for transmitting the electrical output.

Reference will now be made to FIG. 7 taken in conjunction with FIG. 2. As shown in FIGS. 2 and 7, a cooperating pair or set of an East transducer (700e) and a West transducer (700w) are positioned on the panel face (204) of the solar collector (200). they are advantageously adjacent to the East frame member (206e) and West frame member (206w), respectively. At first, when the panel face (204) points toward the sun, both of the cooperating pair of transducers (702e) and (702w) are illuminated equally by the sun, and their corresponding thermal masses (706) have the same temperature. Thereby, the transducers (700e) and (700w) have the same electrical outputs. When the sun moves toward the West, the West frame member (206w) casts a shadow on the adjacent West transducer (700w), causing an immediate fall in temperature of its thermal mass (706). Meanwhile the East transducer (700e) of the cooperating pair remains fully illuminated while adjacent to the East frame member (206e) to maintain a relatively higher temperature of its thermal mass (706). Consequently, the output signal of the illuminated East transducer (700e) remains high by comparison with a receding output of the West transducer (700w) in shadow.

Figure 8:
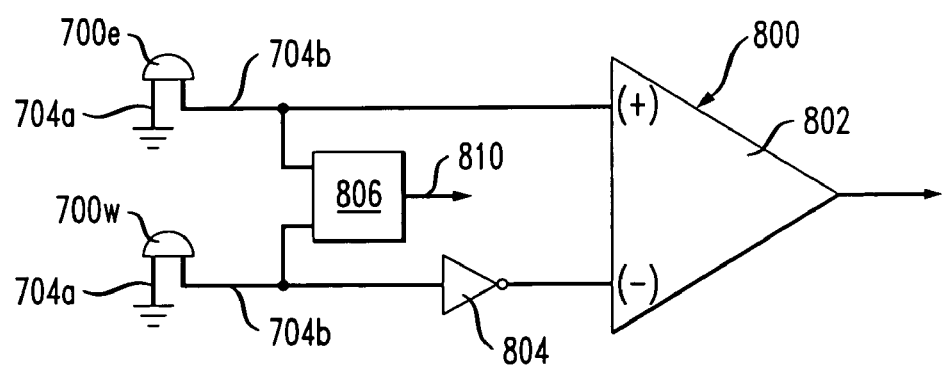
FIG. 8 is a circuit diagram of a motor drive circuit.

FIG. 8 discloses a reversible motor control circuit (800) for each cooperating pair of transducers (700e) and (700w). The thermistor leads (704a) and (704b) of the East transducer (700e) are connected respectively to ground and to a positive input side of a summing amplifier (802). The thermistor leads (704a) and (704b) of the West transducer (700w) are connected respectively to ground and to an inverter (804). In turn, the output of the inverter (804) is connected to a negative input side of the summing amplifier (802). The transducers (700e) and (700w) might change their signals due to rapid changes in ambient temperature. However, the summing amplifier (802) zero sums signal changes due to rapid changes in ambient temperature. The summing amplifier (802) output has an output polarity of the stronger output, or greater output, of either the East transducer (700e) or the West transducer (700w). The summing amplifier (802) output drives the second reversible DC motor (608) to turn the solar collector (200) more to the West or more to the East. Advantageously, a self-correcting feature is provided. Turning to the East would self-correct the solar collector (200) that points too far West, for example, at the beginning of a day. Further, for example, a summing amplifier (802) output signal corresponding to a turn to the East provides a positive stop signal to cease a turn to the West, and self-corrects a tendency to overshoot the turn to the West while tracking the sun.

The output of the illuminated East transducer (700e) remains high, and is supplied to the motor controlled circuit (800) disclosed by FIG. 8 to drive the second motor (608) to pivot the solar collector (200) further toward the West to point at the sun. When both the East transducer (700e) and the West transducer (700w) are illuminated by the sun, their opposite polarity outputs are equal, and the summing amplifier (802) output ceases.

Advantageously, the solar tracking system is self-powered, by generating all of its power requirements to compensate for changes in sun position, and to move the solar collector in a sun tracking mode. The motors (608) operate intermittently in a sun tracking mode, thereby a relatively small, secondary amount of the voltage output capacity of the solar cells (202) is dedicated to drive the motors (608). Further, the solar tracking mode will produce a continuous maximum solar energy conversion to a voltage output of the solar cells (202) as they move to face the sun during daylight hours.

Figure 9:
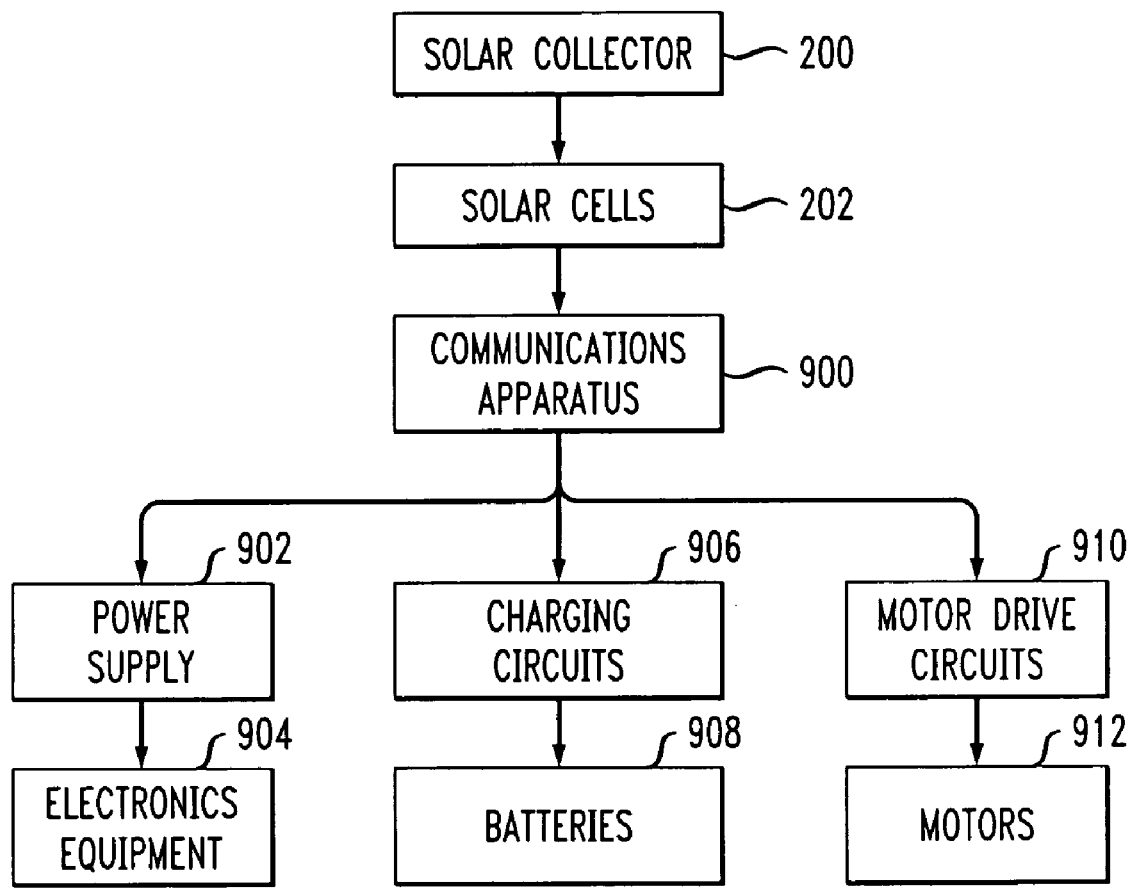
FIG. 9 is a circuit diagram of the solar tracking apparatus and the solar collector supplying output voltage to a communications apparatus.

FIG. 9 discloses a primary voltage output capacity of the solar cells (202) of the solar collector (200) supplies input voltage to a communications apparatus (900). For example, the communications apparatus (900) has an electrical power supply (902) for powering electronic equipment (904) that includes, but is not limited to, components for multiple signal processing and/or signal transmission, transceiver components, electronic control components and switching components. The electronic equipment (904) further includes, but is not limited to, a charging circuit (906) for charging batteries (908) that are used for primary voltage sources and for sources of alternative or back up power. The electronic equipment further includes, but is not limited to, motor drive circuits (910) for motors (912) of various mechanical components in systems, such as, antenna tracking systems and environmental systems, such as, cooling fans and illumination. Accordingly, the communications apparatus (900) preferably includes one or more components of a wireless communications apparatus, and more preferably, includes a base station for wireless communications signals.

At the end of a day, both outputs of the East transducer (700e) and the West transducer (700w) approach zero. At that time, a voltage detector (806) monitors the outputs and produces an output (810) to drive the second motor (608) in a direction to pivot the solar collector (200) Eastward to begin tracking the sun for a following day.

Reference will now be made to FIG. 7 taken in conjunction with FIG. 2. A cooperating pair or set of a South transducer (700s) and a North transducer (700n) are positioned on the panel face (204) of the solar collector (200). They are advantageously adjacent to the South frame member (206s) and North frame member (206n), respectively. When the panel face (204) points toward the sun, both of the cooperating pair of transducers (700s) and (700n) are illuminated equally by the sun, and sense the same temperature. Thereby, they have the same electrical outputs. When the sun ascends in the sky, the North frame member (206n) casts a shadow on the adjacent North transducer (700n), causing an immediate fall in temperature of its thermal mass (706). Meanwhile the South transducer (700s) of the cooperating pair remains fully illuminated while adjacent to the South frame member (206s), and maintains a relatively higher temperature of its thermal mass (706). Consequently, the output signal of the illuminated South transducer (700s) remains high by comparison with a receding output of the North transducer (700n) in shadow. Similarly, when the sun descends toward the horizon, the South transducer (700s) is in shadow to cause a receding output, while the North transducer (700n) remains fully illuminated to produce a relatively high output by comparison with a receding output of the South transducer (700s) in shadow.

The motor control circuit (800) of FIG. 8 is duplicated for the cooperating pair of the South transducer (700s) and North transducer (700n). The output of the North transducer (700n) is supplied to the duplicate inverter (804). The output of the South transducer (700) is supplied to the positive input side of the duplicate summing amplifier (802). The summing amplifier (802) output has an output polarity of the stronger of either the South transducer (700s) or the North transducer (700n).

Advantageously, a self-correcting feature is provided. Turning the solar collector (200) downward to decrease the elevation angle, would self-correct the solar collector (200) that points at too high an elevation angle, for example, at the beginning of a day. Further, for example, a signal corresponding to a turn downward provides a positive stop signal to cease a turn to increase the elevation angle, and self-corrects a tendency to overshoot the turn to increase the elevation angle while tracking the sun's ascent. Similarly, a signal corresponding to a turn to increase the elevation angle provides a positive stop signal to cease a turn to decrease the elevation angle, and self-corrects a tendency to overshoot the turn to decrease the elevation angle while tracking the sun's descent.

The self correcting feature of the present invention is further complemented by the following advantages. Advantageously, the first and second motors (300) and (608) restrain movement of the solar collector (200) due to wind load. A further advantage is that the transducers (700) are unaffected by ambient light conditions caused by artificial lights or lightning flashes. The transducers (700) operate under a wide range of ambient temperatures, and operate to zero sum rapid changes in ambient temperature.

The output of the summing amplifier (802) will track the sun during both ascent and descent. The solar collector (200) tracks the sun's descent to the horizon at the end of a day. The sampling voltage detector (806) in FIG. 8 is used to move the solar collector (200) at the end of the day. Accordingly, the sampling voltage detector (806) would not be required for the duplicated motor control circuit (800) for driving the second motor (608) to reduce the elevation angle of the solar collector (200) to point to the horizon.

The disclosure of every patent, patent application, and publication cited herein is hereby incorporated herein by reference in its entirety.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A solar tracking system, comprising:
   a first set of solar heat gain transducers that produce respective first electrical output signals to drive a reversible first motor for changing a vertical angle of a solar collector;
   a second set of solar heat gain transducers that produce respective second electrical output signals to drive a reversible second motor for changing a horizontal angle of the solar collector;
   each of the transducers having a thermistor in thermal contact with a thermal mass, wherein the thermal mass comprises a mass of conducting material to elevate in temperature while illuminated by the sun, and wherein the thermistor senses the temperature of the thermal mass and produces a corresponding one of the electrical output signals proportional to the temperature; and
   each of the transducers having the thermistor and the thermal mass contained in a solar energy collecting and heat insulating enclosure that is solar energy transparent.

2. The solar tracking system of claim 1, further comprising:
   solar cells on the solar collector; and
   a communications apparatus receiving output voltage from the solar cells.

3. The solar tracking system of claim 1, further comprising:
   the solar energy transparent enclosure, selected from glass or a polymeric material.

4. The solar tracking system of claim 1, further comprising:
   the thermistor having electrical leads projecting from the transparent enclosure.

5. The solar tracking system of claim 1, further comprising:
   a universal joint connecting the solar panel to a base.

6. The solar tracking system of claim 1, further comprising:
   the solar collector being mounted on a rotatable vertical shaft; and
   the shaft having a rack and pinion mechanism driven by the second motor.

7. The solar tracking system of claim 1, further comprising:
   the solar collector having an underside on which is mounted a rotatable horizontal shaft driven by the first motor.

8. The solar tracking system of claim 1, further comprising:
   each of the first motor and the second motor being controlled by a reversible motor control circuit.

9. The solar tracking system of claim 1, further comprising:
   each of the first motor and the second motor being controlled by a reversible motor control circuit;
   each said motor control circuit having a corresponding set of said transducers supplying their output signals to a summing amplifier and an inverter, respectively;
   the inverter supplying an output signal to the summing amplifier; and
   the summing amplifier supplying an output signal to control one of the first motor and the second motor.

10. The solar tracking system of claim 1, further comprising:
    a first rack and pinion mechanism driven by the first motor for changing the vertical angle of the solar collector.

11. The solar tracking system of claim 1, further comprising:
    a first rack and pinion mechanism driven by the first motor for changing the vertical angle of the solar collector;
    each of the first motor and second motor being controlled by a reversible motor control circuit;
    each said motor controlled circuit having a corresponding set of said transducers supplying their output signals to a summing amplifier and an inverter, respectively;
    the inverter supplying an output signal to the summing amplifier; and
    the summing amplifier supplying an output signal to control one of the first motor and the second motor.

12. The solar tracking system of claim 1, further comprising:
    a rack and pinion mechanism driven by the second motor for changing the horizontal angle of the solar collector.

13. The solar tracking system of claim 1, further comprising:
    a rack and pinion mechanism driven by the second motor for changing the horizontal angle of the solar collector;
    each of the first motor and second motor being controlled by a reversible motor control circuit;
    each said motor controlled circuit having a corresponding set of said transducers supplying their output signals to a summing amplifier and an inverter, respectively;
    the inverter supplying an output signal to the summing amplifier; and
    the summing amplifier supplying an output signal to control one of the first motor and the second motor.

* * * * *